United States Patent [19]
Laiho et al.

[11] Patent Number: 5,993,977
[45] Date of Patent: Nov. 30, 1999

[54] POLYMERIC MATERIAL AND ITS USE IN MULTILAYER PRODUCTS

[75] Inventors: Erkki Laiho; Markku Sainio; Seppo Kuusela, all of Porvoo, Finland; Elina Koski, Porsgrunn, Norway; Tapani Penttinen, Pyhtää, Finland; Riitta Koskiniemi, Kotka, Finland; Matti Salste, Imatra, Finland

[73] Assignee: Borealis A/S, Lyngby, Denmark

[21] Appl. No.: 08/737,793

[22] PCT Filed: May 16, 1995

[86] PCT No.: PCT/FI95/00255

§ 371 Date: Feb. 24, 1997

§ 102(e) Date: Feb. 24, 1997

[87] PCT Pub. No.: WO95/32094

PCT Pub. Date: Nov. 30, 1995

[30] Foreign Application Priority Data

May 25, 1994 [FI] Finland ................................ 942416

[51] Int. Cl.⁶ .............................. B32B 27/10; B32B 27/30
[52] U.S. Cl. ...................... 428/514; 428/513; 428/520; 428/34.9; 428/36.6; 428/36.7; 525/57
[58] Field of Search ...................... 428/511, 514, 428/34.9, 513, 520, 36.6, 36.7; 525/57

[56] References Cited

U.S. PATENT DOCUMENTS

| | | | |
|---|---|---|---|
| 4,600,746 | 7/1986 | Schmukler et al. | 525/57 |
| 4,610,914 | 9/1986 | Newsome | 428/216 |
| 4,670,349 | 6/1987 | Najagawa et al. | 428/516 |
| 4,701,360 | 10/1987 | Gibbons et al. | 428/35 |
| 4,948,640 | 8/1990 | Gibbons et al. | 428/34.9 |
| 4,950,510 | 8/1990 | Massouda | 428/34.2 |
| 5,059,459 | 10/1991 | Huffman | 428/34.2 |
| 5,133,999 | 7/1992 | Logfren et al. | 428/34.2 |

FOREIGN PATENT DOCUMENTS

| | | |
|---|---|---|
| A10423511 | 4/1991 | European Pat. Off. . |
| A30571074 | 11/1993 | European Pat. Off. . |
| A13233693 | 3/1984 | Germany . |

OTHER PUBLICATIONS

"Vinyl Alcohol Polymers", Encyclopedia of Polymer Science and Engineering, vol. 17, p. 186, 1985.

*Primary Examiner*—Paul Thibodeau
*Assistant Examiner*—D. Lawrence Tarazano
*Attorney, Agent, or Firm*—Birch, Stewart, Kolasch & Birch, LLP

[57] ABSTRACT

The invention relates to a multilayer product for the production of packaging, the product comprising a carrier web (1), on one face of which there is disposed a tight multilayer coating (2) which includes a moisture-proof layer (b) and a gas-tight layer (a). The gas-tight layer is made up of a blend of an ethylene/vinyl alcohol copolymer and a polar ethylene polymer. The moisture-proof layer is polyolefin, preferably a blend of polyethylene and a polar ethylene polymer.

11 Claims, 2 Drawing Sheets

| LAYERS | g/m² | |
|---|---|---|
| | | outside |
| LDPE | 15 | |
| paperboard | 300 | |
| LDPE | 20 | |
| adhesion plastic | 6 | |
| gas-tight layer | 10 | |
| adhesion plastic | 6 | |
| LDPE | 20 | |
| | | inside |

| LAYERS | g/m² | |
|---|---|---|
| | | outside |
| LDPE | 15 | |
| paperboard | 300 | |
| EVOH+EEA | 10 | |
| NCPE 7158 | 30 | |
| | | inside |

POLYMERIC MATERIAL AND ITS USE IN MULTILAYER PRODUCTS

The invention relates to a packaging material which has good barrier properties vis-á-vis gases and moisture. The invention further relates to a polymeric material which is used as a gastight layer in such packages, and further to multilayer products in which said polymer is used.

Liquid foodstuffs, such as juices, which are sensitive to oxidation, are in general packaged in sales packages made from laminated paperboard. Through selection of the packaging material, efforts are made to provide good chemical and mechanical protection for the product, and the material has to be sufficiently firm in shape to be easy to handle.

There is in general use a packaging material the structural part of which consists of paperboard or paper which is sufficiently firm but, nevertheless, flexible so that a package of a desired shape can be formed therefrom. To protect the structural material from liquid and other moisture, it is coated with plastic, usually polyethylene. However, the oxygen permeability of polyethylene and paperboard is high, and therefore the product would spoil very rapidly if a gas-tight layer were not also added to the package. The gas-tight layer conventionally used has been aluminum foil bonded to the paperboard. Another alternative has been a gas barrier polymer such as ethylene/vinyl alcohol copolymer (EVOH). The purpose of the gas-tight layer is to prevent the access of oxygen into the product and thus, for example, to maintain high the level of vitamin C in the product.

For some time, attempts have been made to eliminate the aluminum foil, for example for reasons of environmental protection, but also because of its poor handlability. Furthermore, the aluminum layer is easily broken.

Finnish Patent FI89567 discloses a barrier structure in which ethylene/vinyl alcohol copolymer is used. Such structures, in the same way as when aluminum is used, usually contain, in addition to the carrier web (polyethylene+paperboard), at least five layers: polyethylene/paperboard/polyethylene/adhesion plastic/gas-tight EVOH polymer/adhesion plastic/polyethylene. The multilayer structure, of course, also increases the price of the package and renders its manufacture complicated. Furthermore, the gas-tight polymer in itself is expensive.

EP patent 423511 sought a solution in which lower amounts of EVOH would suffice. Therein a blend of EVOH and polyethylene is used, in which the amount of polyethylene is at maximum 80%, but preferably at maximum 40%. The EVOH/PE layer on the inside of the package mainly serves as an aroma-proof layer and, if good gas-tightness (oxygen-tightness) is also desired, a second EVOH/PE layer or some other oxygen-tight layer is added, with adhesion plastic layers on its both sides. In this case the number of layers is four in addition to the carrier web.

An object of the present invention is to provide a multilayer product by means of which the disadvantages of the prior art can be eliminated. When polymers according to the invention are used, the number of layers can be reduced from the conventional number, which is usually five in addition to the carrier web, since a separate adhesion plastic layer is not needed. It has been observed, surprisingly, that, if a blend of a commonly known gas-tight polymer, i.e. ethylene/vinyl alcohol copolymer (EVOH), and of a polar ethylene polymer is used in the gas-tight layer, this layer having good adhesion properties and being heat-sealable, the use of the adhesion plastic layer can be abandoned.

In the system according to the invention, the gas-tight layer contains a polar ethylene polymer in an amount of 5–60%, preferably 15–40%. The polar polymer may be a copolymer of ethylene and acrylic ester, such as ethylene/ethyl acrylate copolymer (E/EA), ethylene/butyl acrylate copolymer (E/BA), ethylene/methyl acrylate copolymer (E/MA), ethylene/vinyl acetate copolymer (E/VA), or a copolymer of ethylene and (met)acrylic acid (E/EA, E/MAA). The polar polymer may also be an anhydride- or acid- modified polyolefin, in which case the acid (anhydride) used may be, for example, maleic, fumaric or itaconic acid (anhydride). Furthermore, the polar polymer may also be a terpolymer, such as a terpolymer of ethylene, methyl acrylic acid and butyl acrylic acid (E/MAA/BA) or a copolymer of ethylene, acrylic ester and maleic anhydride. The basis weight of gas-tight polymer is typically 1–20 g/m$^2$, preferably 2–10 g/m$^2$.

Many advantages can be gained by using, instead of ethylene/vinyl alcohol copolymer, a blend thereof and a polar ethylene polymer. The polymer blend also serves as a good oxygen barrier layer when it is inside a coextruded structure, in the same way as does EVOH alone. When the layer made of the polymer blend is on the inside surface of the package structure, a good aroma-proofing is also achieved. As compared with a mere ethylene/vinyl alcohol polymer, a lower blistering tendency and a higher resistance to heat and moisture are achieved. Since one component in the polymer blend is polar, as a consequence better sealability properties, good hot-tack properties, and better adhesion properties are achieved than by using a pure polymer. As a result, the use of a separate adhesion plastic layer can be abandoned. Furthermore, the processibility of the polymer blend is better, and smaller layer thicknesses can be used.

Polyolefin, preferably polyethylene, which may be any polyethylene (LD, HD, LLD, VLD, etc.), is used as the moisture-proof layer. Preferably a polar polymer selected from the same group as the polymers in the gas-tight polymer blend is added to the polyethylene, in an amount of 2–50%, preferably 20–30%. By this addition, good adhesion of the layers to each other is ensured, as is good seal strength at lower sealing temperatures. Furthermore, the blistering tendency is lower. Environment stress crack resistance (ESCR), water vapor transmission rate (WVTR) and frictions are easier to control. Resistance to wear is also better, especially if high-density (HD) or linear (LLD) polyethylene is used, and consequently, plastic dust will not be formed on rapid package-manufacturing lines and the blanks will travel smoothly on the lines.

The polar polymer can be mixed with the ethylene/vinyl alcohol polymer and, respectively, with the polyolefin by any conventional mixing technique. Either melt mixing or dry mixing can be used.

The carrier web may be any web which can be coated, but a combination of paperboard and polyethylene is highly suitable for packages for liquids. The other layers are typically bonded to the carrier web by coextrusion coating.

The number of layers placed on one side of the carrier web, and their mutual order, can be varied according to the application and in particular according to the requirements set by the product to be packaged. With smaller numbers of layers, the price of the multilayer structure, i.e. the packaging material, will be considerably lower. According to the present invention, 2-layer coextrusion instead of the previous 5-layer coextrusion will well suffice for many applications. Owing to the small number of layers, pulpability will be considerably improved, and blistering tendency in the heat-sealing step is nil. The improved pulpability is due above all to the fact that an EVOH/PE layer bonded directly to paperboard detaches from the paperboard more easily than does an adhesion plastic layer. In consequence to easier pulping, recycling of the material will be simpler.

Depending on the application, the gas-tight layer (a) and the moisture-proof layer (b) may be in different orders on the carrier web: a-b, a-a- a-b-a. The order depends on the product to be packaged, i.e. on whether protection is needed specifically against the permeability of moisture, oxygen, aromatic substances, etc.

The invention is described in greater detail with the help of the following examples.

EXAMPLE 1

A gas-tight plastic was prepared by blending an amount of 80% of ethylene/vinyl alcohol copolymer, EVOH (44% ethylene), manufacturer Du Pont and trade name Selar OH 4416, with an amount of 20% of ethylene/ethyl acrylate copolymer, EEA, manufacturer Borealis and trade name NCPE 5860. The mixing was performed in a Berstoff twin screw extruder (Ø=40 mm).

Figure 1:
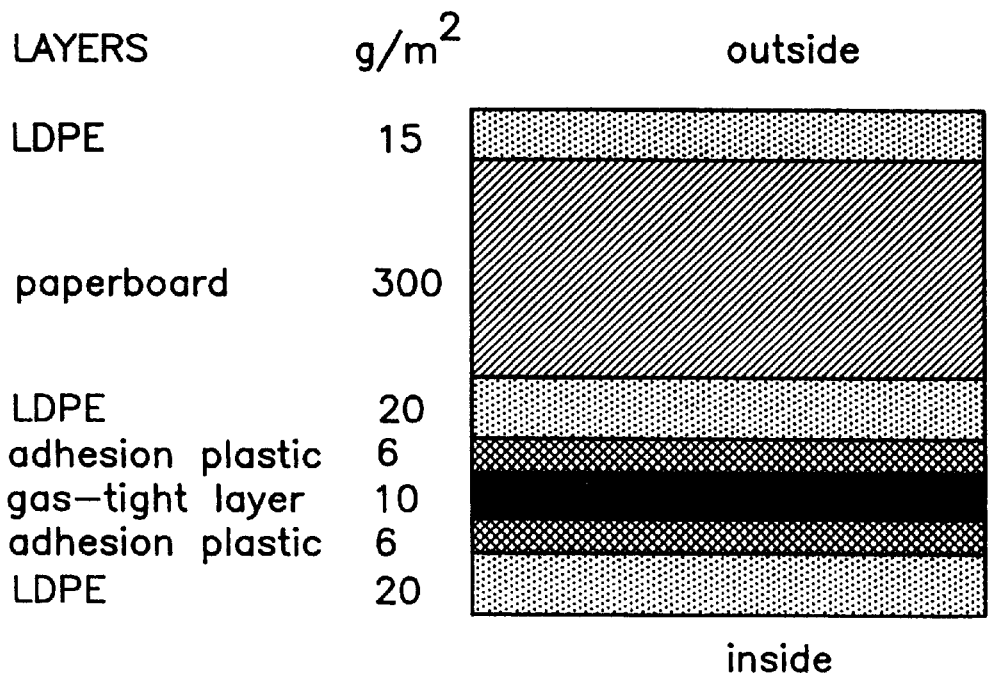
FIG. 1 is an example of the prior art which does not have a polar ethylene copolymer blended in the gas-tight layer.

A carrier web (15 g/m² PE-LD and 300 g/m² paperboard) was coextrusion coated on a Beloit pilot line with a double-layer coating in which the gas-tight layer consisted of 10 g/m² (EVOH+EEA) and the moisture-proof layer consisted of 30 g/m² low-density polyethylene, PE-LD, manufacturer Borealis Polymers Oy and trade name NCPE7518. There were thus only two layers in addition to the carrier web. The oxygen permeability of the material was 6 cm³/m² per 24 h at a temperature of 23° C. and a relative humidity of 50%.

the oxygen permeability of a corresponding conventional 5-layer structure was 4 cm³/m² per 24 h. The layers of the conventional structure were: carrier web 15 g/m² PE-LD and 300 g/m² cardboard, and on top of it a 5-layer coextrusion coating consisting of 20 g/m² PE-LD, 6 g/m² adhesion polymer, 10 g/m² EVOH, adhesion plastic 6 g/m², and PE-LD 20 g/m² (FIG. 1). The adhesion polymer used was polyethylene modified with maleic anhydride, trade name NCPE 0470, manufacturer Borealis Polymers Oy.

The saving of material in the structure according to the invention is considerable as compared with traditional structures, and the gas-tightness is of substantially the same level.

Figure 2:
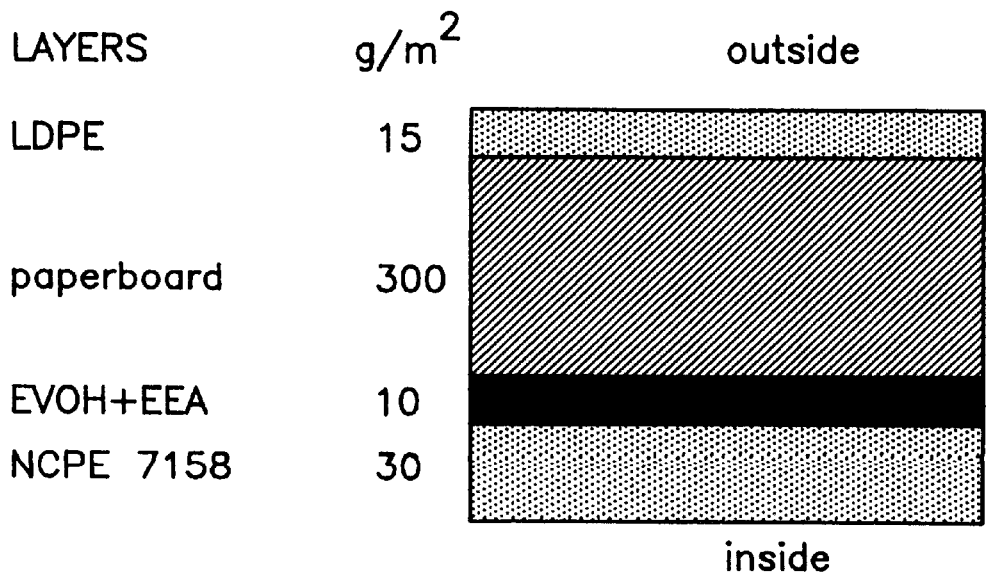
FIG. 2–3 are examples of structures according to the invention in which the gas-tight layer comprises a blend of polar ethylene polymer and ethylene/vinyl alcohol copolymer.

The structure according to the invention is shown in FIG. 2.

EXAMPLE 2

A gas-tight plastic was prepared by mixing an amount of 80% of ethylene/vinyl alcohol copolymer, EVOH (38% ethylene), manufacturer Kuraray and trade name EVAL 101H, with an amount of 20% of polyethylene modified with maleic acid, manufacturer Borealis Polymers Oy and trade name NCPE 0470. The mixing was carried out in the same manner as in Example 1.

A carrier web was coextrusion coated in the same manner as in Example 1, but the thickness of the gas-tight layer was only 6 g/m². The permeability to oxygen was 3 cm³/m² per 24 h, 23° C., 50% relative humidity.

In multilayer packaging materials there has often been a problem of blistering during sealing. The blistering tendency of this product according to Example 2 was 50% less than that of the control product according to FIG. 1.

EXAMPLE 3

To maximize internal adhesion and sealability, modified polyethylene was used also as the polyethylene layer (PE-LD). An amount of 25% of anhydride-modified polyethylene, NCPE 0470, and an amount of 75% of PE-LD, NCPE 7518, were mixed. The thicknesses of the layer were the same as in Example 2. As a consequence, the adhesion to the gas-tight layer and the heat-sealing properties were further improved. Blistering tendency also decreased further.

EXAMPLE 4

Figure 3:
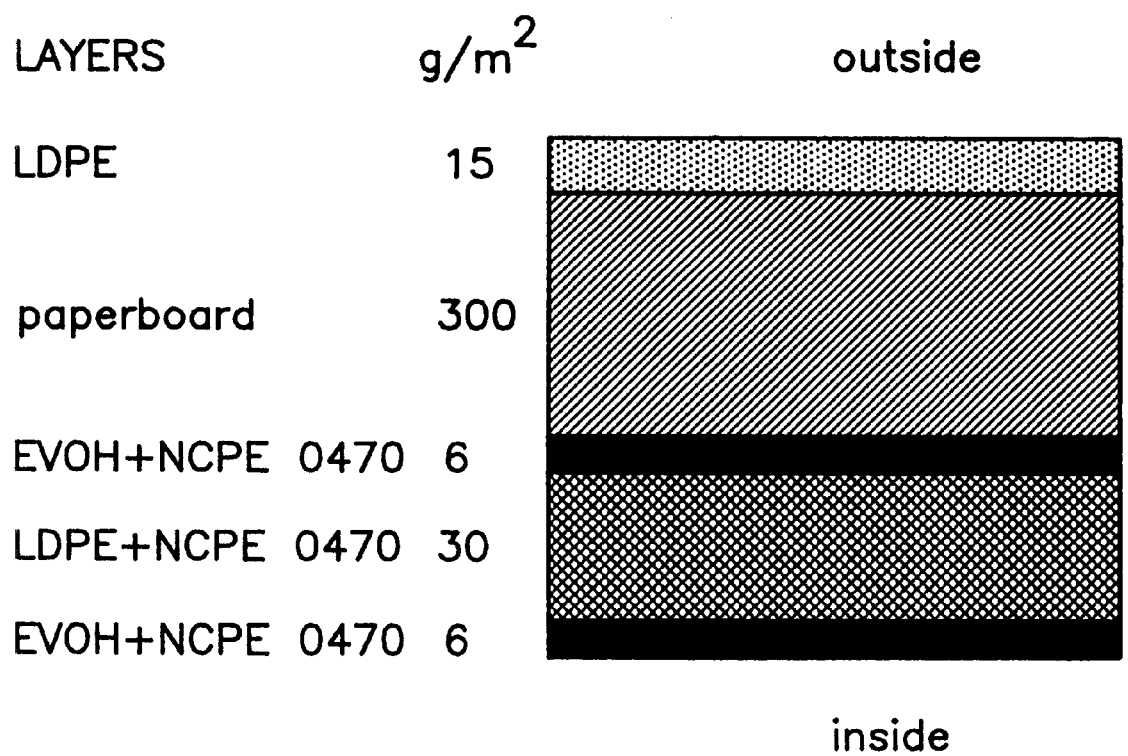

In order to achieve maximal aroma-proofing, impermeability and flavor-tightness of ethereal oils, a structure according to Example 4 was prepared, but a surface layer similar to the gas-tight layer was added to it (FIG. 3). Such a structure has very good properties but, nevertheless, in addition to the carrier web it has only three layers instead of the traditional five.

EXAMPLE 5

In order to improve further the sealing properties and watertightness of the layer coming against the product, the mixing proportions of the gas-tight layer (a) were optimized. A gas-tight plastic was prepared by mixing an amount of 60% of ethylene/vinyl alcohol copolymer, manufacturer Du Pont and trade name SELAR OH 4416, and an amount of 40% of polyethylene modified with maleic acid, manufacturer Borealis Polymers Oy and trade name NCPE 0470. The mixing was carried out as in Example 1.

A film 40 µm thick was prepared of the blend. The permeability of the film to oxygen was 1.3 cm³/m² per 24 h, 23° C., 50% relative humidity. The oxygen permeability of a film of the same thickness made of pure ethylene/vinyl alcohol copolymer was 0.3 cm³/m² per 24 h, 23° C., 50% relative humidity. If a gas-tight blend such as this, in which the ratio of the polymers is 60/40, is used in a layered structure a-b-a, i.e. there are two gas-tight layers, good gas-tightness and aroma-proofing properties are achieved, and the processibility of the gas-tight blend is considerably better than that of pure ethylene/vinyl alcohol copolymer.

The blistering tendency was very low.

EXAMPLE 6

By the use of polymer blends according to the invention, the melt strength of the gas-tight layer can be improved substantially and the so-called blistering tendency of the structure is reduced. Blistering tendency was measured by using a device specially developed for the purpose, in which hot-air blowing is used.

The sample to be tested is attached to a holder, which makes a constant-velocity reciprocal movement under hot-air blowing. The distance from the blower to the sample is 7 mm, and the temperature of the hot air is 350° C. The blowing causes melting of the plastic. The sample will resist without melting under hot air for a number of reciprocal movements which is the greater the better the resistance of the sample to blistering.

The test device clearly correlates with results in practice in packaging machines in which hot air is also used for sealing.

Table 1 shows the results of the blistering test for the control material according to FIG. 1 and for materials according to Examples 3 and 5. The number indicates the number of reciprocal swings. The blistering tendency of the structures according to the invention is considerably lower than that of the control structure.

TABLE 1

Blistering tests in a hot-air blowing device

| number of swings Product | 1 | 1,5 | 2 | 2,5 | 3 | 3,5 | 4 | 4,5 | 5 |
|---|---|---|---|---|---|---|---|---|---|
| Control, 5-layered | U | F | F | F | M | M | — | — | — |
| Ex. 3, 2-layered | U | U | U | U | U | V | F | F | M |
| Ex. 5, 3-layered | U | U | U | U | U | U | U | F | F |

U = unbroken
V = very few holes
F = few holes
M = many holes

As can be seen from the above examples, by the use of gas-tight and moisture-proof polymer blends according to the invention, considerable savings of material can be achieved and simpler manufacturing techniques can be used and, nevertheless, the permeability and other properties obtained for the package will be at least as good as those achieved with conventional alternatives. The processibility of the EVOH/PE blend is better than that of pure EVOH, which is due to the better melt strength of the blend. Consequently, a thinner gas-tight layer than conventional will suffice.

We claim:

1. A multilayer product for the production of liquid packaging comprising:
   (1) a carrier web, wherein said carrier web comprises paper board having an inner and an outer surface; and
   (2) a multilayer coextruded coating disposed on the inner surface paper board, wherein said multilayer coating includes in any order disposed one on top of the other:
      (a) a gas-tight layer comprising a blend of an ethylene/vinyl alcohol copolymer and a polar ethylene polymer, wherein said gas tight layer comprises said polar polymer in an amount of 5–60% by weight, and
      (b) a moisture-proof layer comprising polyethylene.

2. The multilayer product according to claim 1, wherein the polar polymer in the gas-tight layer (a) is a copolymer of ethylene and acrylic ester, a copolymer of ethylene and vinyl acetate, or a copolymer of ethylene and (meth) acrylic acid.

3. The multilayer product according to claim 2, wherein the acrylic ester is a selected from the group consisting of ethyl acrylate, butyl acrylate and methyl acrylate.

4. The multilayer product according to claim 1, wherein the polar polymer in the gas-tight layer is a polyolefin modified with a carboxylic acid or carboxylic anhydride.

5. The multilayer product according to claim 4, wherein the polar polymer in the gas-tight layer is a polyethylene modified with maleic anhydride.

6. The multilayer product according to claim 1, wherein the polar polymer in the gas-tight layer is a copolymer of ethylene, acrylic ester and carboxylic acid or anhydride.

7. The multilayer product according to claim 1, the ethylene content in the ethylene/vinyl alcohol copolymer of the gas-tight layer is 20–50% by weight.

8. The multilayer product according to claim 1, wherein the moisture-proof layer (b) comprises 50–98% low density polyethylene and 50–2% a polar polymer selected from the group consisting of copolymers of ethylene and acrylic ester, copolymers of ethylene and vinyl acetate and copolymers of ethylene and (meth) acrylic acid.

9. The multilayer product according to claim 1, wherein said carrier web further comprises an plastic layer, said plastic layer being coated on the outer surface of said paperboard.

10. The multilayer product according to claim 6, wherein the polar polymer in the gas-tight layer is ethylene/butyl acrylate/(meth) acrylic acid terpolymer.

11. The multilayer product according to claim 9, wherein the amount of polar polymer in said moisture-proof layer is 20–30% by weight.

* * * * *